(12) United States Patent
Morita (10) Patent No.: US 7,440,477 B2
(45) Date of Patent: Oct. 21, 2008

(54) SOLID-STATE LASER GENERATOR

(75) Inventor: Hiroyuki Morita, Kanagawa (JP)

(73) Assignee: Laserfront Technologies, Inc., Kanagawa (JP)

( * ) Notice: Subject to any disclaimer, the term of this patent is extended or adjusted under 35 U.S.C. 154(b) by 51 days.

(21) Appl. No.: 11/288,229

(22) Filed: Nov. 29, 2005

(65) Prior Publication Data
US 2006/0114947 A1    Jun. 1, 2006

(30) Foreign Application Priority Data
Nov. 29, 2004  (JP)  .............................. 2004-344629

(51) Int. Cl.
*H01S 3/10* (2006.01)
(52) U.S. Cl. .......................... 372/21; 372/22
(58) Field of Classification Search ................... 372/22, 372/10, 21, 68, 101
See application file for complete search history.

(56) References Cited

U.S. PATENT DOCUMENTS

| | | | | |
|---|---|---|---|---|
| 5,321,709 A | * | 6/1994 | Beausoleil | 372/22 |
| 5,585,962 A | * | 12/1996 | Dixon | 359/328 |
| 6,002,697 A | * | 12/1999 | Govorkov et al. | 372/34 |
| 6,009,110 A | * | 12/1999 | Wiechmann et al. | 372/10 |
| 6,347,101 B1 | * | 2/2002 | Wu et al. | 372/18 |
| 6,393,034 B1 | * | 5/2002 | Konno et al. | 372/10 |

FOREIGN PATENT DOCUMENTS

| | | |
|---|---|---|
| DE | 44 22 077 A1 | 1/1996 |
| DE | 101 18 793 A1 | 6/2002 |
| JP | 4-369281 A | 12/1992 |
| JP | 6-5962 A | 1/1994 |
| JP | 6-21553 A | 1/1994 |
| JP | 10-215018 A | 8/1998 |
| JP | 2000-299520 A | 10/2000 |
| JP | 3197820 B2 | 6/2001 |
| WO | WO 96/37022 A1 | 11/1996 |

OTHER PUBLICATIONS

Peuser, et al., "Diodengepumpte Festkörperlaser (Diode pumped solid-state lasers)", Springer-Verlag, 1995, pp. 270-271, Berlin.

* cited by examiner

*Primary Examiner*—Armando Rodriguez
(74) *Attorney, Agent, or Firm*—Sughrue Mion, PLLC (57) ABSTRACT

Two laser media are disposed at equal intervals between a first flat mirror, which is a resonator mirror comprising a resonator, and a second flat mirror for separating laser light that transmits second-harmonic laser light and reflects fundamental laser light toward a laser light incident plane; and a dielectric multilayer film is formed on the second flat mirror for separating the laser light. A third flat mirror, which is a resonator mirror, is disposed so as to face a direction 90° to the incident direction of the fundamental laser light in the second flat mirror. A first lens, a nonlinear optical crystal for converting fundamental laser light into a second-harmonic laser light, and a second lens are disposed in sequence in a single row at intervals that are equal to the focal distances f of the first and second lenses between the second and third flat mirrors. Space for accommodating a nonlinear optical crystal and a mirror for separating second-harmonic laser light can thereby be secured while maintaining stabilized resonance conditions, and the output of the solid-state laser generator can be increased.

11 Claims, 6 Drawing Sheets

SOLID-STATE LASER GENERATOR

BACKGROUND OF THE INVENTION

1. Field of the Invention

The present invention relates to a solid-state laser generator with intracavity frequency conversion, and more specifically relates to a solid-state laser generator that converts frequency by using a nonlinear optical crystal.

2. Description of the Related Art

Nd:YAG lasers or other solid-state laser generators are widely used as machining lasers. Recently, solid-state laser generators are rapidly increasing in output from several hundred watts to several kilowatts, and the field of application of the lasers is accordingly expanding from the conventional microfabrication field to welding and cutting applications in the automotive industry. Nevertheless, most solid-state laser generators have an emission wavelength range that is limited to the near infrared range of about 1 μm, bringing about a drawback in that reflectivity with respect to wavelengths outside the near infrared range is high, and the machining efficiency is poor in copper, silicon, and some other materials that have a low absorption rate.

For this reason, methods have been proposed in the prior art (Japanese Patent Application Kokai Publication No. 6-5962, Japanese Patent Application Kokai Publication No. 6-21553, Japanese Patent No. 3197820) in which $LiB_3O_5$ (lithium triborate, LBO), $KTiOPO_4$ (KTP), $\beta$-$BaB_2O_4$ (barium borate, BBO), and other nonlinear optical crystals are used to convert the emission wavelength to a second harmonic, reduce the reflectivity in the surface of the workpiece, increase laser light absorption, and thereby increase the machining efficiency. External cavity frequency conversion and intracavity frequency conversion are types of frequency conversion in which such nonlinear optical crystals are used.

External cavity frequency conversion has a low conversion rate from a laser light at a fundamental frequency (hereinafter referred to as fundamental laser light) to second-harmonic laser light, and fundamental laser light must be condensed with high power density in the nonlinear optical crystals in order to output high-output laser light. For this reason, the upper limit of the output obtained from a simple resonator is in the over 100 W category, and it is difficult to achieve a higher output when reliability is considered.

Intracavity frequency conversion has a high conversion rate to second-harmonic laser light and better reliability in comparison with external cavity frequency conversion. This method is disadvantageous, however, in that the thermal lens effect generated in the solid-state laser medium does not allow higher output to be obtained while a stable resonant condition is maintained. The thermal lens effect is a phenomenon in which the solid-state laser medium is heated by being excited, the temperature distribution produced inside the solid-state laser medium creates a refractive index distribution, and the solid-state laser medium behaves like a lens.

Common solid-state laser media absorb almost no fundamental laser light, but frequency-converted laser light often has high absorption characteristics, particularly with respect to laser light that has been converted to a higher frequency. In view of the above, solid-state laser generators that adopt intracavity frequency conversion are configured to bend the optical path of the laser light at least once and separate the optical path into frequency-converted laser light and fundamental laser light by using a dielectric multilayer film mirror to bring out only the frequency-converted laser light from the resonator, and thereby prevent the frequency-converted laser light from being absorbed by the solid-state laser medium and obtain frequency-converted laser light having good efficiency.

Figure 1:
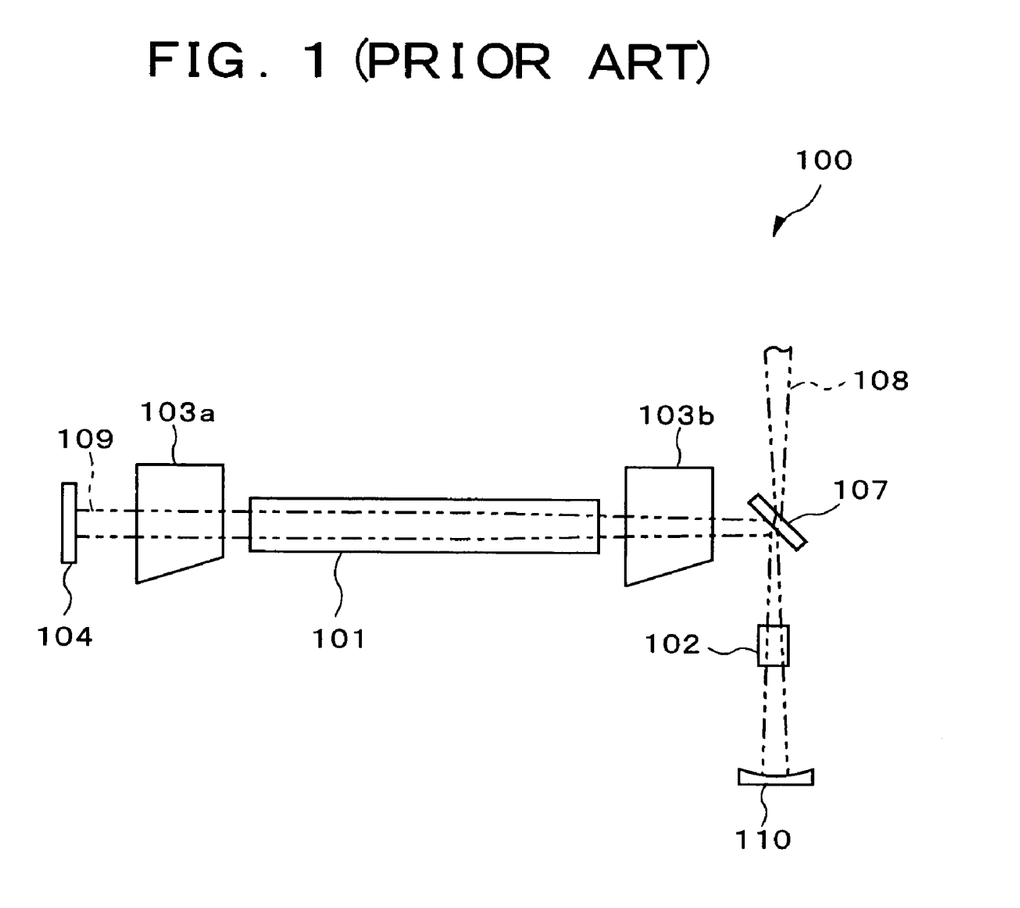
FIG. 1 is a diagram showing the configuration of a resonator in a conventional solid-state laser generator with intracavity frequency conversion.

FIG. 1 is a diagram showing the configuration of a resonator in a conventional solid-state laser generator with intracavity frequency conversion. The resonator 100 of a conventional solid-state laser generator has a configuration in which a flat mirror 104, a Q-switch 103a, a solid-state laser medium 101, a Q-switch 103b, and a flat mirror 107 are disposed in sequence in a single row, as shown in FIG. 1. The flat mirror 107 is disposed so that the laser light transmitted through the Q-switch 103b enters at a 45° angle. A concave mirror 110 and an LBO or another nonlinear optical crystal 102 for converting the frequency of the laser light are disposed in sequence in the direction of travel of the laser light reflected by the flat mirror 107, more specifically, in a direction that is 90° to the incident direction of the laser light.

The flat mirror 104 of the resonator 100 is provided with a dielectric multilayer high-reflection film that reflects the perpendicularly incident fundamental laser light 109, on the surface that faces the Q-switch 103a, more specifically, the laser light incident surface. The flat mirror 107 is a mirror for separating the converted laser light 108, and the laser light incident surface of the mirror is provided with a dielectric multilayer film whereby the fundamental laser light 109 incident at 45° is reflected with high reflectivity, and the second-harmonic laser light 108 incident at 45° is transmitted. The concave mirror 110 is provided with a dielectric multilayer high-reflection film that reflects both the perpendicularly incident fundamental laser light 109 and second-harmonic laser light 108.

For this reason, the fundamental laser light 109 generated in the solid-state laser medium 101 is reflected by the flat mirror 104, is then passed through the solid-state laser medium 101 again, is reflected by the flat mirror 107, and is allowed to enter the nonlinear optical crystal 102. A portion of the fundamental laser light 109 is converted to second-harmonic laser light 108 by the nonlinear optical crystal 102. The fundamental laser light 109 and second-harmonic laser light 108 that have passed through the nonlinear optical crystal 102 are reflected by the concave mirror 110, transmitted through the nonlinear optical crystal 102 again, and converted to another frequency. The fundamental laser light 109 is then reflected by the flat mirror 107 and directed to the Q-switch 103b, and the second-harmonic laser light 108 is transmitted through the flat mirror 107 and brought outside the system. The second-harmonic laser light 108 alone is thereby brought outside the system, and the fundamental laser light 109 is confined therein. In the conventional solid-state laser generator, there is an asymmetry with respect to the solid-state laser medium 101 that is proportionate to the space occupied by the nonlinear optical crystal 102 and the flat mirror 107, at least one mirror is configured as a concave mirror 110, rather than all the mirrors disposed therein being configured as flat mirrors.

The above-described prior art, however, has the drawbacks described below. As described above, a solid-state laser generator with intracavity frequency conversion has a high conversion rate from the fundamental laser light to a second-harmonic laser light, but because a thermal lens effect is created in the solid-state laser medium, the thermal lens focal distance of the solid-state laser medium is reduced when the intensity of the excitation light emitted to the solid-state laser medium is increased in order to obtain high-output laser light.

In a conventional solid-state laser generator with intracavity frequency conversion, the distance between the two flat mirrors, that is to say, the resonator length must be kept to a magnitude of four or less of the focal distance of the solid-state laser medium in the case that two flat mirrors are disposed, for example, as resonator mirrors on both sides of the solid-state laser generator in order obtain a stable resonance state. The shorter the resonator length is, the more stable the high laser output is. However, when the optical path of laser light is configured so as to be folded back, as in the resonator 100 shown in FIG. 1, space is required not only for a nonlinear optical crystal 102, but also for a flat mirror 107 that folds the optical path by reflecting the fundamental laser light 109 and transmits the second-harmonic laser light 108 to separate this light from the fundamental laser light 109. Thus, a solid-state laser generator with a conventional resonator configuration in which the optical path is folded back has drawbacks in that the resonator length cannot be made shorter and a higher output is difficult to obtain.

Figure 2A:
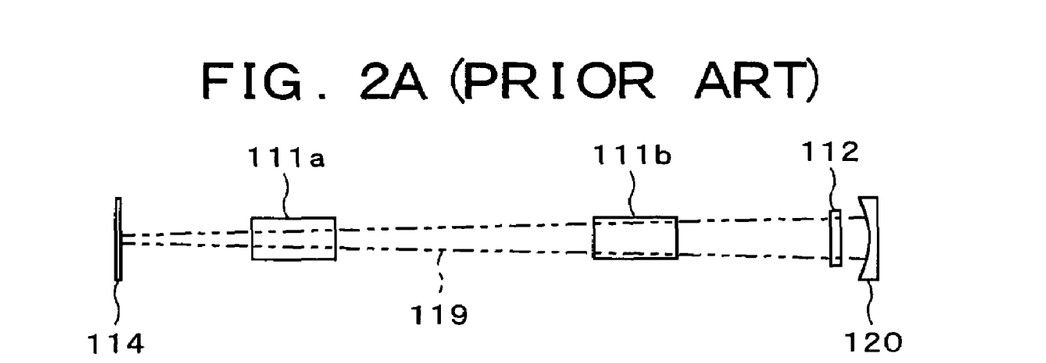
Figure 2B:
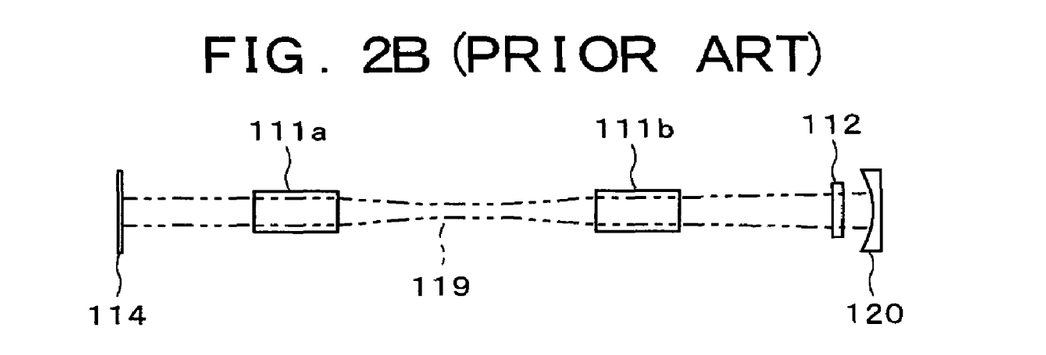
Figure 2C:
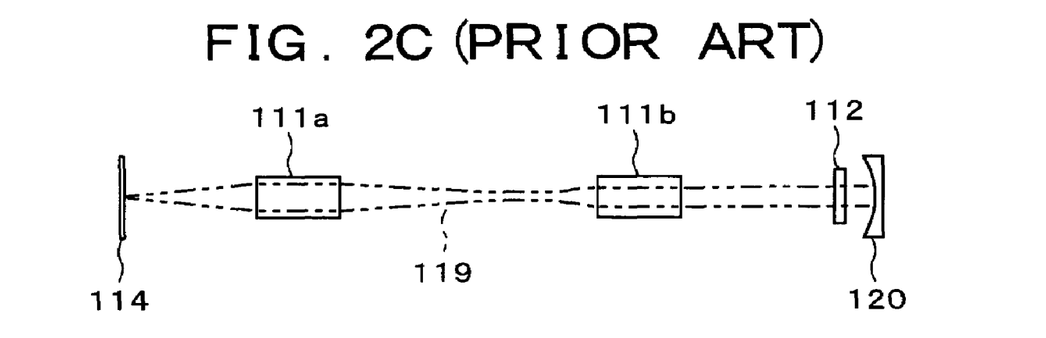

Another drawback is that it is difficult to increase the number of solid-state laser media disposed inside the resonator in a conventional solid-state laser generator with intracavity frequency conversion. FIGS. 2A to 2C are diagrams that show the propagation state of the fundamental laser light when the components of the resonator 100 shown in FIG. 1 are rearranged so as to form a linear optical path. FIG. 2A shows the case in which the intensity of the excitation light input to the solid-state laser medium has low intensity. FIG. 2B shows the case in which the intensity of the excitation light is an intermediate intensity. FIG. 2C shows the case in which the intensity of the excitation light is high. The propagation state of the fundamental laser light 119 shown in FIGS. 2A to 2C is separately obtained by calculation. Shown is a transverse mode of propagation of the fundamental laser light 119 confined within the resonator 100. Two solid-state laser media 111a and 111b are disposed between a flat mirror 114 and concave mirror 120 placed facing each other inside the resonator, as shown in FIGS. 2A to 2C, and the interval between the solid-state laser medium 111b and the concave mirror 120 is extended by a distance equal to the space occupied by the nonlinear optical crystal 112. Thus, when the configuration of the resonator with respect to the solid-state laser medium is asymmetric, the propagation mode formed in this case is also an asymmetric transverse propagation mode. For this reason, the number of solid-state laser media cannot be easily increased inside the resonator in a conventional solid-state laser generator with intracavity frequency conversion.

SUMMARY OF THE INVENTION

An object of the present invention is to provide a solid-state laser generator that can secure space for accommodating a second-harmonic laser light separation mirror and a nonlinear optical crystal and that can provide higher output while maintaining a stable resonance state.

The solid-state laser generator according to the present invention performs frequency conversion inside a resonator. The solid-state laser generator comprises first and second flat mirrors for resonance, a laser medium that amplifies laser light and is disposed between the first and second flat mirrors, one or a plurality of nonlinear optical crystals that are disposed between the laser medium and the second flat mirror and convert the frequency of the laser light, and a lens disposed between the laser medium and the second flat mirror, wherein the interval between the lens and the second flat mirror is equal to the focal distance f of the lens.

In the present invention, a lens is disposed so that the interval from the second flat mirror is equal to the focal distance f of the lens inside the resonator formed between the first and second flat mirrors, whereby the resonance stability conditions can be satisfied until a high output range is reached, even if the length of the resonator is extended, and a higher output can easily be ensured since space can be secured for accommodating a nonlinear optical crystal, a frequency separation mirror, and other components for converting the frequency of the laser light.

The plurality of lenses may be disposed in a confocal position, between the laser medium and the second flat mirror. The resonance stability conditions can be thereby satisfied until a high output range is reached, even if the length of the resonator is extended.

Also, when n (where n is a natural number) pairs of lenses are disposed between the laser medium and the second flat mirror, and the nonlinear optical crystal is disposed between the two lenses constituting the pairs of lenses, the interval between the lenses and the nonlinear optical crystal is preferably equal to the focal distance f of the lenses. It is thereby possible to achieve high reliability simultaneously with high conversion efficiency without modifying the power density in the nonlinear optical crystal.

One or a plurality of dielectric multilayer film mirrors in which a dielectric multilayer film is formed on the laser light incident plane may be disposed between the first and second flat mirrors. In such a case, at least one dielectric multilayer film mirror from among the dielectric multilayer film mirrors preferably reflects laser light with a fundamental frequency and transmits laser light whose frequency has been converted by the nonlinear optical crystal, or transmits laser light with the fundamental frequency and reflects laser light whose frequency has been converted by the nonlinear optical crystal. Since it is thereby possible to separate only the frequency-converted laser light, frequency-converted laser light can be obtained with good efficiency without absorption of the laser light whose frequency has been converted by the solid-state laser medium.

It is possible to provide a plurality of solid-state laser media at equal intervals between the first and second flat mirrors.

Two or more nonlinear optical crystals may be provided. The conversion efficiency can be thereby improved, and a third or fourth harmonic may be generated.

In accordance with the present invention, disposing a lens between two flat mirrors for resonance so that the interval with respect to one of the mirrors is equal to the focal distance f of the lens allows stable resonance conditions to be satisfied until a high output range is achieved, even it the length of the resonator is extended, and space to be secured for accommodating a frequency separation mirror and a nonlinear optical crystal for converting the frequency of the laser light. As a result, higher output can be achieved.

BRIEF DESCRIPTION OF THE DRAWINGS

FIGS. 2A to 2C are diagrams showing the propagation state of fundamental laser light when the components of the resonator shown in FIG. 1 are rearranged so as to form a linear optical path, wherein FIG. 2A shows the case in which the intensity of the excitation light input to the solid-state laser medium is low, FIG. 2B shows the case in which the intensity of the excitation light is an intermediate intensity, and FIG. 2C shows the case in which the intensity of the excitation light is high;

FIGS. 4A to 4C are diagrams showing the propagation state of fundamental laser light when the components of the resonator shown in FIG. 3 are rearranged so as to form a linear optical path, wherein FIG. 4A shows the case in which the intensity of the excitation light input to the solid-state laser medium is low, FIG. 4B shows the case in which the intensity of the excitation light is an intermediate intensity, and FIG. 4C shows the case in which the intensity of the excitation light is high;

DETAILED DESCRIPTION OF THE PREFERRED EMBODIMENTS

Figure 3:
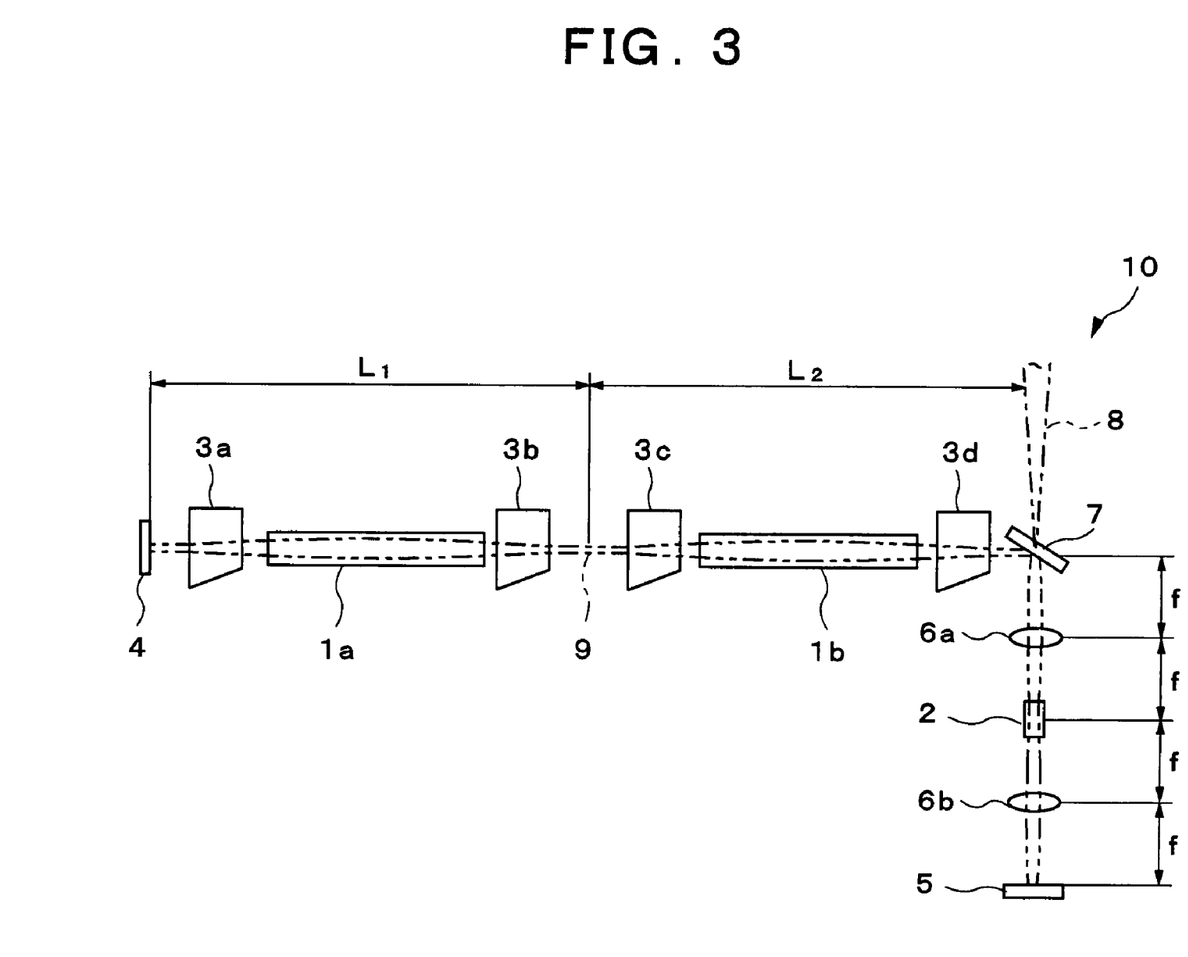
FIG. 3 is a diagram showing the configuration of a resonator in the solid-state laser generator of a first embodiment of the present invention.

The solid-state laser generator according to embodiments of the present invention is described in detail below with reference to the attached diagrams. The solid-state laser generator according to a first embodiment of the present invention will first be described. FIG. 3 is a diagram showing the configuration of a resonator in the solid-state laser generator of the present embodiment. The solid-state laser generator of the present embodiment is a solid-state laser generator with intracavity frequency conversion that has a resonator for performing a second-harmonic conversion.

The resonator 10 in the solid-state laser generator of the present embodiment has a Q-switch 3a, a solid-state laser medium 1a for amplifying the fundamental laser light 9, a Q-switch 3b, a Q-switch 3c, a solid-state laser medium 1b for amplifying the fundamental laser light 9, and a Q-switch 3d arranged in sequence in a single row between a flat mirror 4 as a resonator mirror, and a flat mirror 7 as a laser light separation mirror, as shown in FIG. 3. The components are disposed so that the length $L_1$ of the resonator section comprising the solid-state laser medium 1a and the Q-switches 3a and 3b, and the length $L_2$ of the resonator section comprising the solid-state laser medium 1b and the Q-switches 3c and 3d are equal to each other.

The flat mirror 7 is disposed so that the fundamental laser light 9 that has passed through the Q-switch 3d enters at an angle of 45°. A flat mirror 5, which is a resonator mirror, is disposed in a direction that is 90° with respect to the direction of travel of the fundamental laser light 9 reflected by the flat mirror 7, that is to say, the incident direction of the fundamental laser light 9. A lens 6a, a nonlinear optical crystal 2 for converting the fundamental laser light 9 to second-harmonic laser light 8, and a lens 6b are furthermore arranged in sequence in a single row between the flat mirrors 7 and 5.

The solid-state laser media 1a and 1b in the resonator 10 are, for example, Nd:YAG rods, and a dielectric multilayer antireflection film is formed on the incident plane of the laser light so as to allow the perpendicularly incident fundamental laser light 9 to pass therethrough. The nonlinear optical crystal 2 is an LBO crystal on which a dielectric multilayer antireflection film is formed for transmitting both the fundamental laser light 9 and second-harmonic laser light 8 that are perpendicularly incident on the incident plane of the laser light, for example. A dielectric multilayer antireflection film is furthermore formed on the incident planes of the laser light of Q-switches 3a to 3d so as to allow the perpendicularly incident fundamental laser light 9 to pass therethrough.

A dielectric multilayer high-reflection film for reflecting the perpendicularly incident fundamental laser light 9 is formed on the laser light incident plane of the flat mirror 4, and a dielectric multilayer high-reflection film for reflecting both the perpendicularly incident fundamental laser light 9 and second-harmonic laser light 8 is formed on the laser light incident plane of the flat mirror 5. The flat mirror 7 is a 45°-incident flat mirror for separating the frequency-converted laser light, and a dielectric multilayer film for reflecting the fundamental laser light 9 and transmitting the second-harmonic laser light 8 is formed on the incident plane of the laser light.

The lenses 6a and 6b are treated with a dielectric multilayer antireflection film for transmitting both the second-harmonic laser light 8 and fundamental laser light 9 that are perpendicularly incident on the incident plane of the laser light. The lens 6b is disposed in a position separated from the flat mirror 5 by a distance f equal to the focal distance thereof, and the lens 6a is disposed in a position separated from the lens 6b by twice the distance 2f of the focal distance. The flat mirror 7 is disposed in a position separated from the lens 6a by a distance f, and the nonlinear optical crystal 2 is disposed in an intermediate position between the lenses 6a and 6b. In the solid-state laser generator of the present embodiment, a telescope with a magnification of 1 is constituted in this manner by arranging a pair of equivalent lenses facing each other inside the resonator 10.

A rod-type solid-state laser generator usually generates heat and creates a thermal lens effect when excitation light is input to the rod, which is a solid-state laser medium. For this reason, Eq. 1 described below must be satisfied in order to stably obtain resonance. In Eq. 1, $f_R$ is the focal distance of the thermal lens of the rod, which is a solid-state laser medium, $R_1$ and $R_2$ are the radii of curvature of the resonator mirrors, and the $L_1$ and $L_2$ are distances between the resonator mirrors and the principal plane of the thermal lens.

$$\left(1 - \frac{L_2}{f_R} - \frac{L_0}{R_1}\right) \times \left(1 - \frac{L_1}{f_R} - \frac{L_0}{R_2}\right) < 1 \quad \text{where} \qquad [\text{Eq. 1}]$$

$$L_0 = L_1 + L_2 - \frac{L_1 \times L_2}{f_R}$$

It follows from Eq. 1 that when the radii of curvature $R_1$ and $R_2$ of the resonator mirrors are infinite, that is to say, when a flat mirror is used as the resonator mirror, the focal distance $f_R$ of the thermal lens satisfies the stability conditions of Eq. 1 in the range of $4 f_R < L_1 + L_2$ in the case of an symmetric resonator in which the distances $L_1$ and $L_2$ between the resonator mirrors and the principal planes of the thermal lens are mutually equal. Since the focal distance $f_R$ of the thermal lens is reduced in an inverse proportion to the input of the excitation light, the length L of the resonator must be made as short as possible when the output of the generated laser light is made higher.

When the two resonator mirrors are configured as flat mirrors, and the mirrors are symmetrically disposed about the position of the principal plane of the thermal lens, the transverse mode for resonating inside the resonator is also made center symmetric, and a beam waist can be formed on the mirror surface. For this reason, higher output can be easily ensured while maintaining the stability of the resonator by configuring the resonator so that two solid-state laser media are disposed at equal intervals, equivalent thermal lenses are generated in the media, and both ends thereof are terminated at a flat mirror.

In a solid-state laser generator with intracavity frequency conversion, however, a nonlinear optical crystal, a flat mirror for separating laser light, a Q-switch, and other components must be provided, and space for these components is required. For this reason, it is difficult to reduce the resonator length, and since the distances $L_1$ and $L_2$ between the resonator mirrors and the principal plane of the thermal lens cannot be made equal due to the optical components disposed on one side, the configuration of the resonator becomes asymmetric and it is difficult to achieve higher output.

In view of the above, in the solid-state laser generator of the present embodiment, one or a plurality of lenses are disposed in a suitable position inside the resonator, whereby the length of the resonator is extended and stability conditions are maintained until high input is reached, and space is secured for accommodating in this section a nonlinear optical element for frequency conversion and a mirror for separating laser light. More specifically, when the radius of the beam waist in front of the lens, which is the focal distance $f_L$, is $\omega_1$, the flare angle is $\theta_1$, and the distance from the beam waist to the lens is $d_1$, and when the radius of the beam waist behind the lens, which is the focal distance $f_L$, is $\omega_2$, the flare angle is $\theta_2$, and the distance from the lens to the beam waist is $d_2$, the following Eqs. 2 to 4 are obtained from propagation formulas and laws of beam volume conservation for laser light that has passed through the lenses.

$$\frac{1}{\omega_2^2} = \left(\frac{1}{\omega_1^2}\right) \times \left(1 - \frac{d_1}{f_L}\right)^2 + \frac{1}{(f_L \times \theta_1)^2} \quad [\text{Eq. 2}]$$

$$d_2 - f_L = \frac{(d_1 - f_L) \times f_L^2}{(d_1 - f_L)^2 + \left(\frac{\omega_1}{\theta_1}\right)^2} \quad [\text{Eq. 3}]$$

$$\omega_1 \times \theta_1 = \omega_2 \times \theta_2 \quad [\text{Eq. 4}]$$

Eqs. 2 to 5, Eqs. 3 to 6, and Eqs. 4 to 7 can each be determined when the distance $d_1$ from the beam waist to the lens and the focal distance $f_L$ of the lens match, that is to say, when the lenses are disposed so that $d_1 = f_L$.

$$\omega_2 = f_L \times \theta_1 \quad [\text{Eq. 5}]$$

$$d_2 = f_L \quad [\text{Eq. 6}]$$

$$\theta_2 = \frac{\omega_1}{f_L} \quad [\text{Eq. 7}]$$

Eqs. 2 to 8, Eqs. 3 to 9, and Eqs. 4 to 10 each hold true when a flat mirror is disposed in a position that is $d_2 = f_L$ from the lens to specularly reflect laser light, and the radius of the beam waist and the flare angle are reproduced at the beam waist position of the returned light.

$$\omega_3 = f_L \times \theta_2 = \omega_1 \quad [\text{Eq. 8}]$$

$$d_3 = f_L \quad [\text{Eq. 9}]$$

$$\theta_3 = \frac{\omega_2}{f_L} = \theta_1 \quad [\text{Eq. 10}]$$

The stability conditions of the resonator can be maintained until a high output region is reached even if the length of the resonator is extended, by making use of these characteristics, using a flat mirror as the resonator mirror, and arranging the lenses at a distance equal to the focal distance.

This relationship holds even if the resonator 10 is configured as a telescope in which a plurality of lenses is disposed at confocal points. As in the solid-state laser generator of the present embodiment, for example, the radius $\omega_0$ of the beam waist in front of the lenses 6a and 6b is reduced in association with the increase in the input of excitation light (proportional to laser light output) when the resonator 10 is an asymmetric resonator in which the flat mirrors 4 and 5 are used as resonator mirrors, when a telescope with a magnification of 1 in which two lenses 6a and 6b are disposed at confocal points inside the resonator are provided, when the telescope is disposed away from the flat mirrors 4 and 5 at a distance equivalent to the focal distance, and when the nonlinear optical crystal 2 is disposed in the confocal position of the telescope. However, the flare angle $\theta_0$ of the beam will conversely increase. For this reason, the radius of the beam waist of the laser light condensed inside the nonlinear optical crystal 2 by way of the lenses 6a and 6b is $\omega_1 = f_L \times \theta_0$ from Eq. 2, and the diameter of the beam condensed inside the nonlinear optical crystal 2 during low excitation input is reduced, but the beam diameter is conversely increased during high excitation input.

In frequency conversion by a nonlinear optical crystal, there is usually a possibility that the conversion efficiency will be reduced if the power density is excessively low, and the nonlinear optical crystal will be damaged if the power density is excessively high. Therefore, the power density is preferably set to a level that is equal to or less than the damage threshold and allows an adequate conversion efficiency to be obtained. In the solid-state laser generator of the present embodiment, control such as one in which the variation in power density of the laser light condensed inside the nonlinear optical crystal 2 is reduced in a broad range can be ensured by suitably selecting the focal distance f of the lenses 6a and 6b disposed inside the resonator 10. Furthermore, an asymmetric resonator comprising a portion that does not include the portion extended by the telescope formed by the lenses 6a and 6b can be configured by arranging a plurality of solid-state laser media in multiple stages while maintaining stability conditions. A higher output can therefore be obtained.

The operation of the solid-state laser generator of the present embodiment is described next. In the solid-state laser generator of the present embodiment, fundamental laser light 9 with a wavelength of 1064 nm, for example, is generated in the solid-state laser media 1a and 1b. The fundamental laser light 9 is reflected by the flat mirror 4, is then amplified as it again passes through the Q-switch 3a, solid-state laser medium 1a, Q-switch 3b, Q-switch 3c, solid-state laser medium 1b, and Q-switch 3d, is reflected by the flat mirror 7, and is directed to the nonlinear optical crystal 2 via the lens 6a. A portion of the fundamental laser light 9 is converted, for example, to 532-nm second-harmonic laser light 8 by the nonlinear optical crystal 2. The fundamental laser light 9 and second-harmonic laser light 8 that have passed through the nonlinear optical crystal 2 are reflected by the flat mirror 5 via the lens 6b, are transmitted again in sequence through the lens 6b, nonlinear optical crystal 2, and lens 6a, and are converted to another frequency. The fundamental laser light 9 is then reflected by the flat mirror 7 and directed to the Q-switch 3d. The second-harmonic laser light 8 is transmitted through the flat mirror 7 and is brought outside the system. Only the second-harmonic laser light 8 is thereby brought outside the system, and the fundamental laser light 9 is confined inside the system.

Thus, in the solid-state laser generator of the present embodiment, two mutually equivalent lenses 6a and 6b are disposed between the flat mirror 5 for resonance and the flat mirror 7 for laser light separation, and the nonlinear optical crystal 2 is disposed between the pair of lenses. Therefore, resonance stability conditions can be satisfied until a high output range is reached even if the length of the resonator is extended, and space can be secured for accommodating nonlinear optical components for frequency conversion, mirrors for frequency separation, and other components.

Figure 4A:
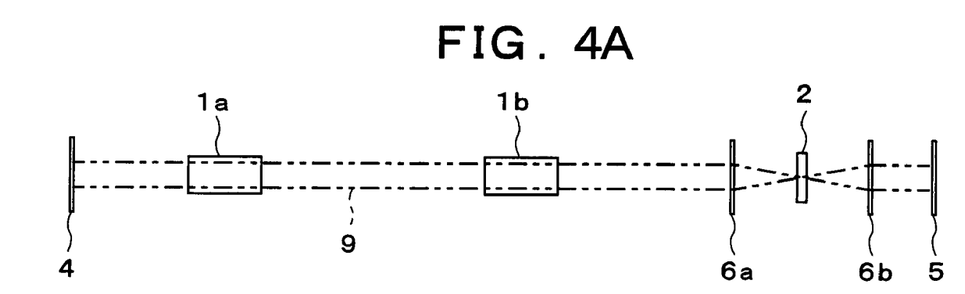
Figure 4B:
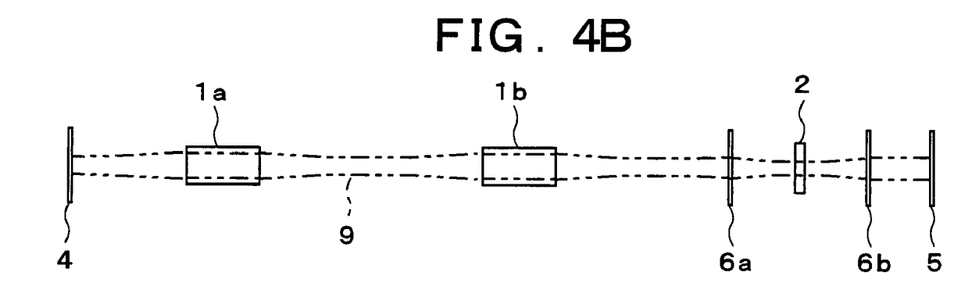
Figure 4C:
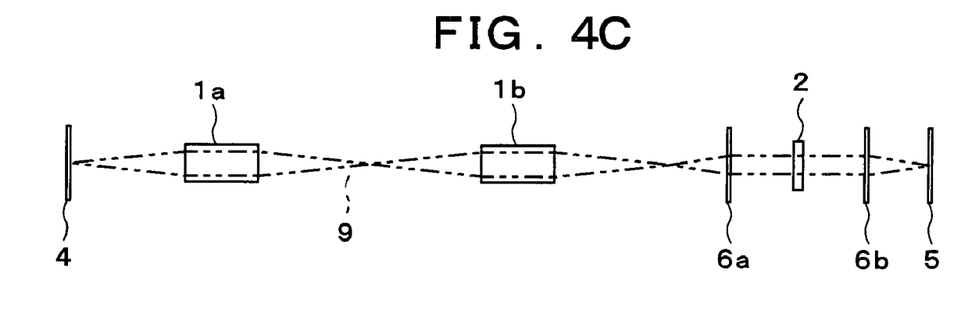

Since the configuration of the resonator in a range that excludes the extended portion is symmetric with respect to the solid-state laser media 1a and 1b, a higher output can be easily achieved because a plurality of solid-state laser media can be connected in multiple stages. FIGS. 4A to 4C are diagrams showing the propagation state of fundamental laser light when the components of the resonator shown in FIG. 3 are rearranged so as to form a linear optical path. FIG. 4A shows the case in which the intensity of the excitation light input to the solid-state laser medium is low. FIG. 4B shows the case in which the intensity of the excitation light is an intermediate intensity. FIG. 4C shows the case in which the intensity of the excitation light is high. In the solid-state laser generator of the present embodiment, the solid-state laser media 1a and 1b disposed inside the resonator each exhibit a symmetric transverse propagation mode regardless of the intensity of the excitation light, and it is apparent that the number of media can be easily increased by arranging the media at equal intervals, as shown in FIGS. 4A to 4C.

Figure 5:
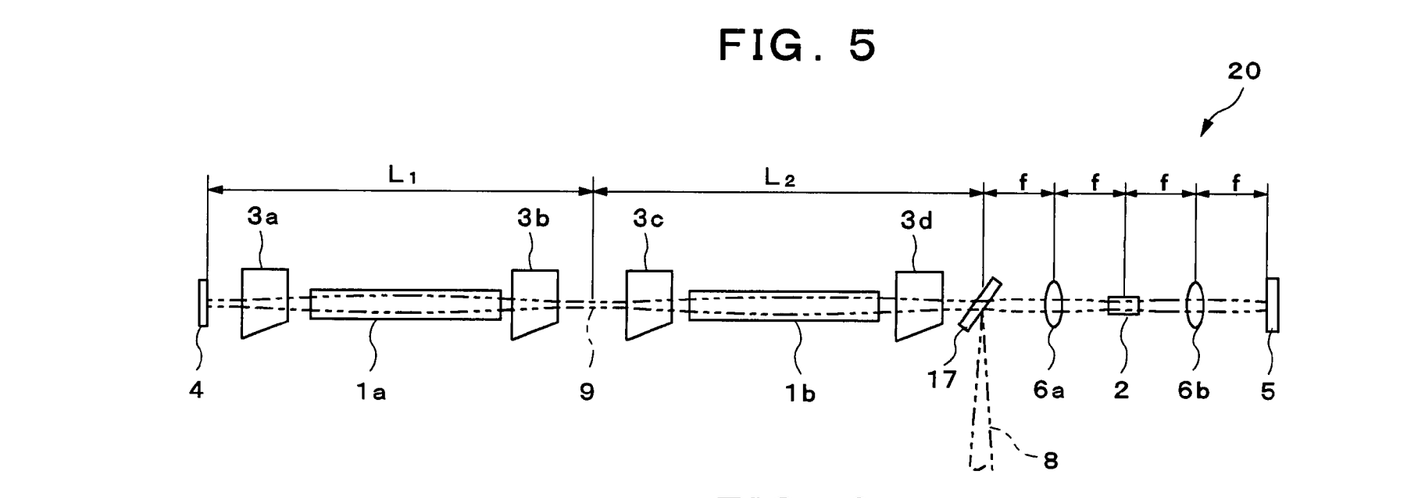
FIG. 5 is a diagram showing the configuration of the resonator in the solid-state laser generator of a second embodiment of the present invention.

The solid-state laser generator of the second embodiment of the present invention is described next. The solid-state laser generator of the present embodiment is a solid-state laser generator with intracavity frequency conversion in the same manner as the solid-state laser generator of the above-described first embodiment, and is provided with a resonator for second harmonic conversion. FIG. 5 is a diagram showing the configuration of the resonator in the solid-state laser generator of the present embodiment. In FIG. 5, the same constituent components of the resonator shown in FIG. 3 are assigned the same reference numerals, and a detailed description is omitted. The resonator 20 in the solid-state laser generator of the present embodiment is a single row of sequentially arranged Q-switch 3a, solid-state laser medium 1a that amplifies the fundamental laser light 9, Q-switch 3b, Q-switch 3c, solid-state laser medium 1b that amplifies the fundamental laser light 9, Q-switch 3d, flat mirror 17, which is a mirror used for separating laser light, lens 6a, nonlinear optical crystal 2 that converts fundamental laser light 9 into second-harmonic laser light 8, and lens 6b between flat mirrors 5 and 6, which are resonator mirrors, as shown in FIG. 5.

In the resonator 20, the length $L_1$ of the resonator section comprising the solid-state laser medium 1a and the Q-switches 3a and 3b, and the length $L_2$ of the resonator section comprising the solid-state laser medium 1b and the Q-switches 3c and 3d are equal to each other. The lens 6b is disposed in a position separated from the flat mirror 5 by a distance f equal to the focal distance thereof, and the lens 6a is disposed in a position separated from the lens 6b by twice the distance 2f of the focal distance. The flat mirror 17 is disposed in a position separated from the lens 6a by a distance f, and the nonlinear optical crystal 2 is disposed in an intermediate position between the lenses 6a and 6b. In the solid-state laser generator of the present embodiment, a telescope with a magnification of 1 is constituted in this manner by arranging a pair of equivalent lenses facing each other inside the resonator 20.

In the solid-state laser generator of the present embodiment, the flat mirror 17 in which the incident plane of the laser light is provided with a dielectric multilayer film for reflecting the second-harmonic laser light 8 and transmitting the fundamental laser light 9 is used as a mirror for separating laser light. The flat mirror 17 is a 45°-incident flat mirror, and this mirror is disposed so that the fundamental laser light 9 transmitted through the Q-switch 3d, and the fundamental laser light 9 and second-harmonic laser light 8 transmitted through the lens 6a enter at a 45° angle.

The operation of the solid-state laser generator of the present embodiment is described next. In the solid-state laser generator of the present first embodiment 1064-nm fundamental laser light 9, for example, is generated in the solid-state laser media 1a and 1b. The fundamental laser light 9 is reflected by the flat mirror 4, is then amplified as it again passes through the Q-switch 3a, solid-state laser medium 1a, Q-switch 3b, Q-switch 3c, solid-state laser medium 1b, and Q-switch 3d, is reflected by the flat mirror 17, and is directed to the nonlinear optical crystal 2 via the lens 6a. A portion of the fundamental laser light 9 is converted, for example, to 532-nm second-harmonic laser light 8 by the nonlinear optical crystal 2. The fundamental laser light 9 and second-harmonic laser light 8 that have passed through the nonlinear optical crystal 2 are reflected by the flat mirror 5 via the lens 6b, are transmitted again in sequence through the lens 6b, nonlinear optical crystal 2, and lens 6a, and are converted to another frequency. The fundamental laser light 9 is then transmitted by the flat mirror 17 and directed to the Q-switch 3d, and the second-harmonic laser light 8 is reflected by the flat mirror 17 and is brought outside the system. Only the second-harmonic laser light 8 is thereby brought outside the system, and the fundamental laser light 9 is confined inside the system.

In the solid-state laser generator of the present embodiment, two mutually equivalent lenses 6a and 6b are disposed between the flat mirror 5 for resonance and the flat mirror 17 for laser light separation, and the nonlinear optical crystal 2 is disposed between the pair of lenses. Therefore, resonance stability conditions can be satisfied until a high output range is reached even if the length of the resonator is extended, and space can be secured for accommodating nonlinear optical components for frequency conversion, mirrors for frequency separation, and other components. The configuration and effects of the solid-state laser generator of the present embodiment are the same as those of the above-described solid-state laser generator of the first embodiment, except for those described above.

Figure 6:
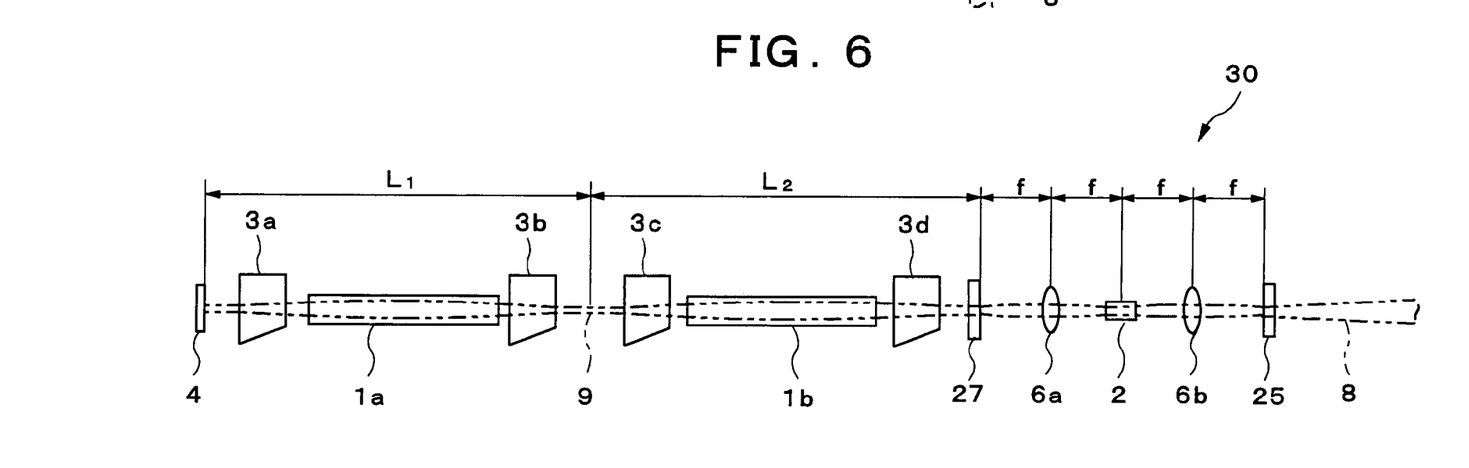
FIG. 6 is a diagram showing the configuration of the resonator in the solid-state laser generator of a third embodiment of the present invention.

The solid-state laser generator of the third embodiment of the present invention is described next. A 45°-incident flat mirror for separating laser light is disposed between the Q-switch 3d and lens 6a in the solid-state laser generator of the first and second embodiments described above, but the present invention is not limited thereby, and the fundamental laser light 9 and second-harmonic laser light 8 may be separated by a resonator mirror. FIG. 6 is a diagram showing the configuration of the resonator in the solid-state laser generator of the present embodiment. In FIG. 6, the same constituent components of the resonator shown in FIG. 3 are assigned the same reference numerals, and a detailed description is omitted. The resonator 30 in the solid-state laser generator of the present embodiment is a single row of sequentially arranged Q-switch 3a, solid-state laser medium 1a that amplifies the fundamental laser light 9, Q-switch 3b, Q-switch 3c, solid-state laser medium 1b that amplifies the fundamental laser light 9, Q-switch 3d, flat mirror 27, lens 6a, nonlinear optical crystal 2 that converts fundamental laser light 9 into second-harmonic laser light 8, and lens 6b between flat mirrors 4 and 25, which are resonator mirrors, as shown in FIG. 6.

In the resonator 30, the length $L_1$ of the resonator section comprising the solid-state laser medium 1a and the Q-switches 3a and 3b, and the length $L_2$ of the resonator section comprising the solid-state laser medium 1b and the Q-switches 3c and 3d are equal to each other. The lens 6b is disposed in a position separated from the flat mirror 25 by a distance f equal to the focal distance thereof, and the lens 6a is disposed in a position separated from the lens 6b by twice the distance 2f of the focal distance. The flat mirror 27 is disposed in a position separated from the lens 6a by a distance f, and the nonlinear optical crystal 2 is disposed in an intermediate position between the lenses 6a and 6b. In the solid-state laser generator of the present embodiment, a telescope with a magnification of 1 is constituted in this manner by arranging a pair of equivalent lenses facing each other inside the resonator 30.

The flat mirror 27 is disposed so that the fundamental laser light 9 transmitted through the Q-switch 3d, and the fundamental laser light 9 and second-harmonic laser light 8 transmitted through the lens 6a are perpendicularly incident. A dielectric multilayer film that transmits the fundamental laser light 9 and reflects the second-harmonic laser light 8 is formed on the incident plane of the laser light. The flat mirror 25 is a resonator mirror and a mirror for separating laser light, and a dielectric multilayer film that reflects the perpendicularly incident fundamental laser light 9 and transmits the second-harmonic laser light 8 is formed on the incident plane of the laser light.

The operation of the solid-state laser generator of the present embodiment is described next. In the solid-state laser generator of the present first embodiment 1064-nm fundamental laser light 9, for example, is generated in the solid-state laser media 1a and 1b. The fundamental laser light 9 is reflected by the flat mirror 4, is then amplified as it again passes through the Q-switch 3a, solid-state laser medium 1a, Q-switch 3b, Q-switch 3c, solid-state laser medium 1b, and Q-switch 3d, is transmitted by the flat mirror 27, and is directed to the nonlinear optical crystal 2 via the lens 6a. A portion of the fundamental laser light 9 is converted, for example, to 532-nm second-harmonic laser light 8 by the nonlinear optical crystal 2. The fundamental laser light 9 and second-harmonic laser light 8 that have passed through the nonlinear optical crystal 2 enter the flat mirror 25 via the lens 6b. In this case, the fundamental laser light 9 is reflected by the flat mirror 25, is again transmitted through the lens 6b, nonlinear optical crystal 2, and lens 6a, is converted to another frequency, and is transmitted through the flat mirror 27 to enter the Q-switch 3d. The second-harmonic laser light 8 passes through the flat mirror 25 and is brought outside the system. Only the second-harmonic laser light 8 is thereby brought outside the system, and the fundamental laser light 9 is confined inside the system. Thus, in the solid-state laser generator of the present embodiment, the fundamental laser light 9 and second-harmonic laser light 8 are separated by the flat mirror 25, which is a resonator mirror.

In the solid-state laser generator of the present embodiment, two mutually equivalent lenses 6a and 6b are disposed between the flat mirrors 27 and 5, and the nonlinear optical crystal 2 is disposed between the pair of lenses. Therefore, resonance stability conditions can be satisfied until a high output range is reached even if the length of the resonator is extended, and space can be secured for accommodating nonlinear optical components for frequency conversion, mirrors for frequency separation, and other components. The configuration and effects of the solid-state laser generator of the present embodiment are the same as those of the solid-state laser generator of the above-described first embodiment, except for those described above.

In the solid-state laser generator in the above-described first through third embodiments, two solid-state laser media 1a and 1b are disposed inside the resonator, but the present invention is not limited thereby. Since the resonator is configured as a symmetric resonator and is extended by a pair of lenses (lenses 6a and 6b) in confocal positions, any number of solid-state laser media can be disposed at equal intervals as long as the damage tolerance of the optical components is not exceeded. Also, other than the Nd:YAG rod, Yb:YAG, Nd:YLF, Nd:YVO$_4$, and other solid-state laser media may be used.

In the solid-state laser generator of the above-described first through third embodiments, a single nonlinear optical crystal is disposed inside the resonator in order to generate a second harmonic, but the present invention is not limited thereby. A plurality of nonlinear optical crystals may be disposed in order to improve conversion efficiency and to generate a third or fourth harmonic. Other than the LBO described above, CLBO ($C_3LiB_6O_{10}$), KTP, BBO, or the like may be used as the nonlinear optical crystal 2.

The effects of the present invention are described by comparing the characteristics of an example that is within the scope of the present invention and the characteristics of a comparative example that is outside the scope of the present invention. A solid-state laser generator (example) provided with the resonator shown in FIG. 3 was prepared as the example of the present invention, and a solid-state laser generator (comparative example) provided with the conventional resonator shown in FIG. 1 was prepared as the comparative example of the present invention. The pulse width of the Q-switch was fixed without dependence on the excitation intensity, and the beam diameter and power density of the fundamental laser light condensed inside the nonlinear optical crystal 2 were obtained by computation. In this case, the solid-state laser medium was a Nd:YAG rod, and the nonlinear optical crystal was LBO.

Figure 7A:
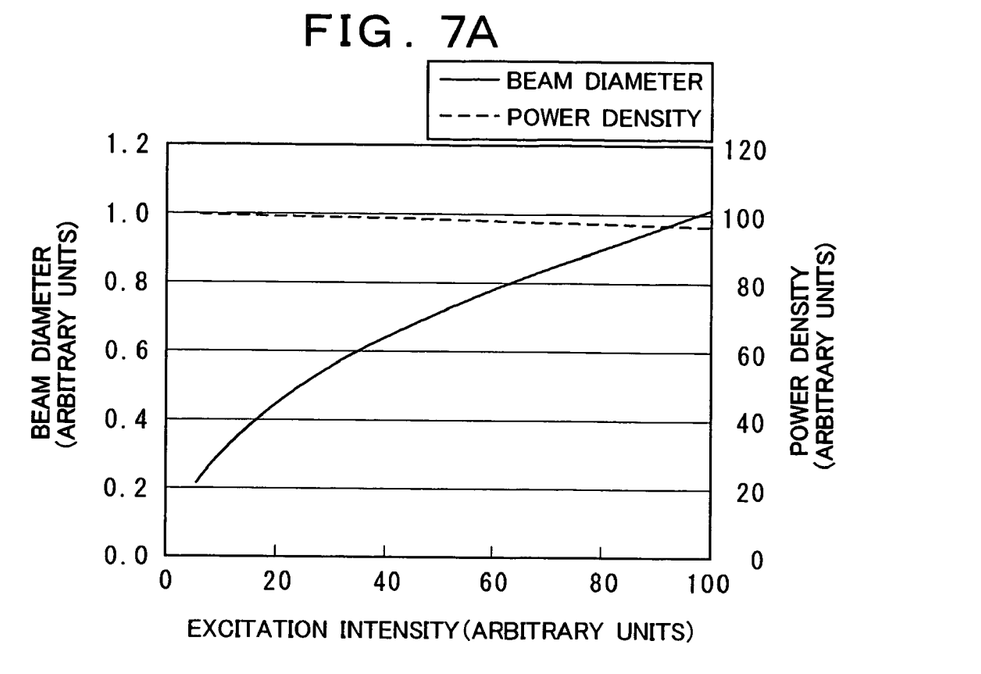
FIG. 7A is a graph showing the characteristics of a solid-state laser generator according to an example of the present invention, wherein the horizontal axis represents the excitation intensity, and the vertical axes represent the power density and the beam diameter of the fundamental laser light condensed inside an LBO crystal.
Figure 7B:
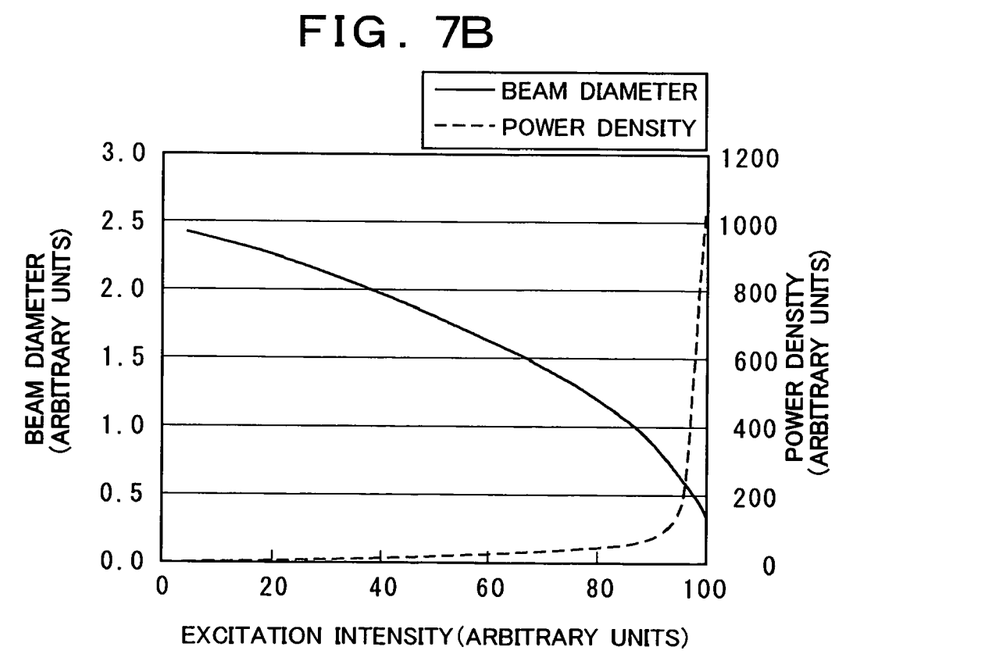
FIG. 7B is a graph showing the characteristics of a solid-state laser generator according to a comparative example of the present invention, wherein the horizontal axis represents the excitation intensity, and the vertical axes represent the power density and the beam diameter of the fundamental laser light condensed inside an LBO crystal.

FIG. 7A is a graph showing the characteristics of a solid-state laser generator according to the example of the present invention, wherein the horizontal axis represents the excitation intensity and the vertical axes represent the power density and the beam diameter of the fundamental laser light condensed inside the LBO crystal; and FIG. 7B is a graph showing the characteristics of a solid-state laser generator according to the comparative example of the present invention, wherein the horizontal axis represents the excitation intensity and the vertical axes represent the power density and the beam diameter of the fundamental laser light condensed inside the LBO crystal. The variation in the power density of the condensed fundamental laser light was low from low input to high input for the solid-state laser generator of the example, in comparison with the solid-state laser generator of the comparative example, as shown in FIGS. 7A and 7B.

What is claimed is:

1. A solid-state laser generator for frequency conversion inside a resonator, comprising:
   first and second flat mirrors for resonance,
   a plurality of solid-state laser media that amplify laser light and are disposed at equal intervals between said first and second flat mirrors,
   one or a plurality of nonlinear optical crystals that are disposed between said laser medium and said second flat mirror and convert the frequency of said laser light, and
   a lens disposed between said laser medium and said second flat mirror, wherein the interval between the lens and said second flat mirror is equal to the focal distance f of said lens.

2. The solid-state laser generator according to claim 1, further comprising a plurality of lenses, each disposed in a confocal position between said laser medium and said second flat mirror.

3. The solid-state laser generator according to claim 1, wherein n (where n is a natural number) pairs of lenses are disposed between said plurality of laser media and said second flat mirror;
   said nonlinear optical crystal is disposed between first lens and a second lens constituting one of said pairs of lenses; and
   an interval between said first lens and said second lens and said nonlinear optical crystal is equal to the focal distance f of said first lens and said second lens, respectively.

4. The solid-state laser generator according to claim 2, wherein n (where n is a natural number) pairs of lenses are disposed between said plurality of laser media and said second flat mirror;
   said nonlinear optical crystal is disposed between first lens and a second lens constituting one of said pairs of lenses; and
   an interval between said first lens and said second lens and said nonlinear optical crystal is equal to the focal distance f of said first lens and said second lens, respectively.

5. The solid-state laser generator according to claim 1, wherein
   one or a plurality of dielectric multilayer film mirrors in which a dielectric multilayer film is formed on a laser light incident plane are disposed between said first and second flat mirrors; and
   at least one dielectric multilayer film mirror selected from the group consisting of said dielectric multilayer film mirrors reflects laser light with a fundamental frequency and transmits laser light whose frequency has been converted by said nonlinear optical crystal.

6. The solid-state laser generator according to claim 2, wherein
   one or a plurality of dielectric multilayer film mirrors in which a dielectric multilayer film is formed on a laser light incident plane are disposed between said first and second flat mirrors; and
   at least one dielectric multilayer film mirror selected from the group consisting of said dielectric multilayer film mirrors reflects laser light with a fundamental frequency and transmits laser light whose frequency has been converted by said nonlinear optical crystal.

7. The solid-state laser generator according to claim 1, wherein
   one or a plurality of dielectric multilayer film mirrors in which a dielectric multilayer film is formed on a laser light incident plane are disposed between said first and second flat mirrors; and
   at least one dielectric multilayer film mirror selected from the group consisting of said dielectric multilayer film mirrors transmits laser light with a fundamental frequency and reflects laser light whose frequency has been converted by said nonlinear optical crystal.

8. The solid-state laser generator according to claim 2, wherein
   one or a plurality of dielectric multilayer film mirrors in which a dielectric multilayer film is formed on a laser light incident plane are disposed between said first and second flat mirrors; and
   at least one dielectric multilayer film mirror selected from the group consisting of said dielectric multilayer film mirrors transmits laser light with a fundamental frequency and reflects laser light whose frequency has been converted by said nonlinear optical crystal.

9. The solid-state laser generator according to claim 1, comprising two or more nonlinear optical crystals.

10. The solid-state laser generator according to claim 2, comprising two or more nonlinear optical crystals.

11. A solid-state laser generator, comprising:
    a resonator bounded by a first flat mirror and a second flat mirror;
    a first laser medium and a second laser medium, which amplify laser light and are disposed within said resonator;
    at least one nonlinear optical crystal disposed between said second laser medium and said second flat mirror, which converts a frequency of laser light passing therethrough;
    at least one Q-switch disposed between the first laser medium and said second laser medium;
    at least one lens disposed between said second laser medium and said second flat mirror, wherein an interval between said lens and said second flat mirror is equal to a focal distance f of said lens.

* * * * *